(12) United States Patent
Kiessner-Haiden

(10) Patent No.: US 7,974,758 B2
(45) Date of Patent: Jul. 5, 2011

(54) METHOD AND APPARATUS FOR THE SETTING OF THE TORQUE TRANSMITTED BY A FRICTION CLUTCH

(75) Inventor: Martin Kiessner-Haiden, Lebring (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 609 days.

(21) Appl. No.: 12/151,527

(22) Filed: May 7, 2008

(65) Prior Publication Data

US 2008/0277224 A1 Nov. 13, 2008

(30) Foreign Application Priority Data

May 7, 2007 (DE) .......................... 10 2007 021 302

(51) Int. Cl.
*G06F 19/00* (2006.01)
*F16D 48/06* (2006.01)
(52) U.S. Cl. ........................................ 701/68; 192/84.6
(58) Field of Classification Search .................. None
See application file for complete search history.

(56) References Cited

U.S. PATENT DOCUMENTS

| | | | |
|---|---|---|---|
| 5,704,460 A * | 1/1998 | Leimbach | 192/70.252 |
| 6,193,039 B1 * | 2/2001 | Doremus et al. | 192/70.252 |
| 7,032,733 B2 | 4/2006 | Parigger | |
| 7,522,984 B2 | 4/2009 | Karrelmeyer et al. | |
| 2004/0238311 A1 | 12/2004 | Parigger | |
| 2007/0061060 A1 | 3/2007 | Karrelmeyer et al. | |

FOREIGN PATENT DOCUMENTS

| | | |
|---|---|---|
| DE | 103 28 712 A1 | 1/2005 |
| WO | WO03/025422 A1 | 3/2003 |

\* cited by examiner

*Primary Examiner* — Michael J. Zanelli
(74) *Attorney, Agent, or Firm* — Harness, Dickey & Pierce, P.L.C.

(57) ABSTRACT

A method and apparatus for setting the torque transmitted by a friction clutch via an actuator chain having an electric motor, a reduction gear and a mechanism for converting the rotary movement of the electric motor. In the method, a desired angle of rotation of the electric motor or a link of the actuator chain is determined from the torque to be transmitted by the friction clutch and is set in a setting procedure based on a given torque/angle dependence. To compensate for wear inside the friction clutch, a calibration process takes place in which a first correction angle is determined for the torque/angle dependence. Variations in a torque/power consumption dependence caused by wear within the actuator chain are also taken into account. Specifically, the number of setting procedures of the electric motor within a predetermined time interval is determined and is used to correct the torque/power consumption dependence.

27 Claims, 2 Drawing Sheets

METHOD AND APPARATUS FOR THE SETTING OF THE TORQUE TRANSMITTED BY A FRICTION CLUTCH

CROSS-REFERENCE TO RELATED APPLICATIONS

This application claims the benefit and priority of German Application No. 10 2007 021 302.8. The entire disclosure of the above application is incorporated herein by reference.

FIELD

The present invention relates to a method for setting the torque transmitted by a friction clutch by means of an actuator chain having an electric motor which effects a displacement of a pressure plate of the friction clutch via a reduction gear unit and a mechanism for the conversion of the rotary movement of the electric motor into a translatory movement, wherein a desired angle of rotation of the electric motor or of a link of the actuator chain is determined from the torque to be transmitted by the friction clutch based on a given torque/angle dependence and is set in a setting procedure by means of a regulator acting on the electric motor, and wherein a calibration procedure takes place for the compensation of wear within the friction clutch which results in a variation of the given torque/angle dependence and, in the calibration procedure, a power consumption of the electric motor on the closing of the clutch is measured, a torque respectively corresponding to the measured current is determined via a given torque/power consumption dependence, and a first correction angle for the torque/angle dependence is determined from the determined torque and the then currently detected angle of rotation, with a variation of the torque/power consumption dependence caused by wear occurring within the actuator chain additionally being taken into account. The invention is furthermore directed to an apparatus for the carrying out of this method.

BACKGROUND

The statements in this section merely provide background information related to the present disclosure and may not constitute prior art.

A method as well as an apparatus for the setting of the torque transmitted by a friction clutch are known from WO 03/025422 A1 of the same applicant. The content of this reference, in particular the structure of the friction clutch as well as of the control transmission for the friction clutch described therein, and also the method described in this known application for the setting of the transmitted torque, the calibration method described for the compensation of wear within the friction clutch and the method for the setting and determination of the respective angle of rotation of the electric motor are incorporated by reference in its entirety in the disclosure content of the present application.

A method and an apparatus of the initially named kind are used, for example, in transfer cases by which the torque to be transmitted to the drive wheels of a vehicle is set variably in dependence on the respective driving situation. In this setting procedure, not only a controlled engagement of the friction clutch is required, but also in each case a longer operation with a precisely set torque in accordance with the torque to be transmitted. Depending on the dynamic driving demands, which may, for example, be dependent on the manner of driving of the vehicle operator or on environmental influences (such as a slick road surface with slip occurring), a more frequent or less frequent variation takes place in the amount of the torque to be transmitted, which is reflected in a correspondingly different number of setting procedures of the electric motor.

In accordance with WO 03/025422 A1, the angle of rotation of the electric motor or of a link of the actuator chain may be set to a value corresponding to the torque to be transmitted for the setting of the desired torque to be transmitted. For this purpose, a torque/angle dependence is determined empirically which may, for example, be stored as a characteristic in the form of a table or of a function and which is used for the determination of the angle of rotation corresponding to the desired torque.

It is, however, problematic here that due to wear within the friction clutch and in particular due to disk wear, a displacement of the characteristic may occur that has to be taken into account in the setting of the torque to be transmitted. In accordance with WO 03/025422 A1, the characteristic may therefore be recalibrated at specific time intervals, which is called a calibration procedure or also a post-calibration within the framework of the present application. Within the framework of this post-calibration, the electric motor is, for example, as a rule controlled in the direction "close clutch" on the shutting down of the vehicle motor until the disks of the friction clutch come into contact with one another, which results in a rise in the motor current. A first correction angle for the torque/angle dependence may be determined from the measured current value and the then currently determined angle of rotation, as is described in detail in WO 03/025422 A1. In every calibration procedure, this first correction angle may be updated and stored in order to be able to achieve a setting of the desired torque by a corresponding setting of the angle of rotation based on the original torque/angle dependence while additionally using the first correction angle. It is generally also possible that the then current torque/angle dependency is in each case varied and stored in accordance with the determined first correction angle so that the respective then currently stored torque/angle dependence may be used directly for the setting of the torque to be transmitted.

It is problematic with this post-calibration that it is not the actually transmitted torque, but rather the power consumption of the electric motor, which is determined via a given torque/power consumption dependence, which is measured for the determination of the first correction angle (i.e., for the determination of the displacement of the characteristic used for the torque/angle dependence). This in turn, analogously to the torque/angle dependence, corresponds to a characteristic that may, for example, be stored as a table or as a function. The torque/power consumption dependence may in this connection likewise be determined in a base calibration with reference to corresponding measured values.

The efficiency of the actuator transmission may change over time due to wear within the actuator chain, for example at the reduction gear unit, which is preferably designed as a worm gear or as a helical gear, so that the values for the torque/power consumption dependence determined in the base calibration have to be corrected. In this connection, either an increase in efficiency or a decrease in efficiency may occur in dependence on the respective design of the reduction gear unit. For example, with a metal-to-metal pairing of a worm gear, the surfaces of the intermeshing teeth are worn down over the course of time so that their surface roughness decreases, whereby an increase in efficiency occurs. With a plastic-to-metal pairing, wherein plastic with embedded carbon fibers is used, the carbon fibers that come to the fore due to wear can, in contrast, provide an increased friction and thus a reduction in efficiency.

Both changes in efficiency have an effect on the power consumption of the electric motor during the post-calibration and thus also influence the angle of rotation used as the basis for this calibration. The wear within the actuator chain thus falsifies the result determined by the post-calibration so that ultimately the torque set in operation via the position of the angle of rotation does not exactly correspond to the desired torque to be transmitted.

Attempts have therefore already been made to take account of the wear occurring within the actuator chain and the thereby caused variation of the torque/power consumption dependence, in addition to the post-calibration, in that the respective mileage of a motor vehicle provided with the friction clutch is determined and a correction of the torque/power consumption dependence is carried out in dependence on the mileage or a determined first correction angle is subsequently corrected.

It is disadvantageous with such a kilometer-dependent correction that different driving behaviors of the motor vehicle operator as well as different environmental influences are not taken into account. For example, an aggressive driving behavior means a higher number of setting procedures and thus a greater wear within the reduction gear unit than for example a reticent driving manner. This different wear due to a different driving behavior or due to different environmental influences is not taken into account by a kilometer-dependent correction of the torque/power consumption dependence. Something similar applies when, for example, the kilometers driven are recorded on highway trips, since in this case the wear within the reduction gear unit is relatively small, which is likewise not correctly detected by a kilometer-dependent correction.

It is furthermore not ensured that the respective mileage may in all cases be transferred to a corresponding correction unit via a corresponding interface since such interfaces are not available in all cases. In this case, a correction based on the mileage is completely precluded.

SUMMARY

The present disclosure provides a method and an apparatus wherein the torque to be transmitted in each case from the friction clutch may also be set correctly on wear occurring within the actuator mechanism or chain.

The number of the setting procedures of the electric motor may be determined within a preset time interval and is used to take account of the change of the torque/power consumption dependence. An apparatus may be characterized in that the correction unit includes a counter for the determination of the number of setting procedures of the electric motor within a preset time interval and uses the determined number to take account of the variation in the torque/power consumption dependence.

It is ensured by the determination and use of the number of the setting procedures of the electric motor that a value corresponding to the actual wear within the actuator chain is used for the correction of the torque/power consumption dependence. In this connection, the number of setting procedures may be detected directly by the components used for the setting of the torque to be transmitted so that no additional data such as the mileage are required for which additional sensors would be necessary. The apparatus thus forms a system closed on itself which may provide all the data required for the method in accordance with the present disclosure.

The number of the setting procedures of the electric motor are each determined between two sequential calibration procedures. The preset time interval thus corresponds to the time interval between two sequential calibration procedures so that it is ensured that the setting procedures of the electric motor which have occurred since the last calibration procedure and which result in wear within the actuation chain are taken into account for every new calibration procedure. It is thus ensured that the wear which has occurred since the last calibration procedure is correctly taken into account in each calibration procedure.

The number of the setting procedures is in each case determined at a plurality of sequential time intervals. A corresponding correction of the post-calibration thus does not only take place once, but preferably for all sequential time intervals in order thus to be able correctly to take account of further progressing wear within the actuator chain.

The number of setting procedures in each case determined sequentially are preferably added up. The corresponding summed number of setting procedures may then be taken into account for the correction in each case based on the torque/power consumption dependence originally determined in a base calibration. It is generally also possible that the number of setting procedures is reset to zero after each correction made and for this purpose the torque/power consumption dependence corrected by the then currently determined number of setting procedures is stored and is used as the base for the next correction after the end of the next time interval.

The calibration procedure in each case takes place on the shutting down of the engine of a vehicle provided with the friction clutch. It is ensured, on the one hand, in this manner that the operation of the vehicle during driving is not disturbed by a corresponding calibration procedure and that, on the other hand, a sufficient number of calibration procedures are carried out to reliably detect and take account of the wear occurring during operation within the actuator chain and within the friction clutch.

An additional correction angle for the torque/angle dependence is determined from the number of setting procedures. The result of the then current post-calibration may be corrected by the additional correction angle such that a variation in the torque/power consumption dependence is taken into account. In this connection, the additional correction angle may be added to or subtracted from the first correction value in dependence on the wear occurring within the actuator chain.

If the reduction gear unit is designed so that an efficiency increase occurs on wear, the additional correction value may be subtracted from the first correction value. In this case, namely, the first correction angle, which is determined during the calibration procedure, is too large since, due to the higher efficiency, the measured current value corresponds to a higher torque than would be transmitted without a change in efficiency. The increase in the angle of rotation to be set for a torque to be transmitted which occurs due to the disk wear is thus partly compensated by the efficiency increase due to the wear within the actuator chain so that the second correction angle is to be subtracted from the first correction value.

In contrast to this, on a reduction of efficiency within the actuator chain, the additional correction angle is added to the first correction angle since, due to the drop in efficiency, the angle of rotation determined by the calibration procedure has to be increased even further in order actually to be able to reach the torque value to be transmitted by the friction clutch.

The additional correction value may be determined in linear dependence on the number of setting procedures determined overall. On the basis of empirical determinations, it may, for example, be assumed that a displacement of the angle of rotation by approximately 2° occurs with an essentially linear dependence up to a number of 10,000 setting procedures. Depending on the number determined during the respective time interval taken into account, the correction angle determined by the post-calibration may thus be corrected accordingly by a correction value of 2°/10,000 per number determined. Depending on the embodiment of the actuator chain, the deviation in the angle of rotation to be expected at approximately 10,000 setting procedures may in particular lie between approximately 0.5° to 5°, in particular between approximately 1° to 3°. It is also possible to relate the expected total deviation to another number, for example to a value from between approximately 5,000 and 15,000 setting procedures.

The torque to be set may be selected from a preset torque range, with the preset torque range being split into a plurality of individual ranges and only those setting procedures being used to take account of the change of the torque/power consumption dependence in which torques are transmitted which fall at least into one or more preset individual ranges, the so-called relevant individual ranges. In this connection, the preset torque range may preferably be divided into three individual ranges, with the relevant individual range being formed by the middle of the three individual ranges.

It may be taken into account that only a limited torque range is relevant to the post-calibration and thus for the correction of the first correction angle determined by the post-calibration. A relevant torque range of approximately between 100 and 600 Nm, in particular from approximately 200 to 400 Nm may preferably be used in this connection. The preset torque range may, for example, cover the range from 0 to 1000 Nm, preferably from 0 to 750 Nm.

Torques which are disposed beneath the relevant individual range do not cause any real wear so that they do not have to be taken into account in the post-calibration and thus also not in the correction of the post-calibration. Since higher torque ranges are usually also not considered in the post-calibration, and since these higher torques have no effect on the post-calibration, a consideration of these higher torques is also not required in the correction of the post-calibration. It may preferably be assumed that only those torque ranges have to be taken into account in the correction of the post-calibration, which are also relevant to the determination of the first correction angle, during the post-calibration.

Only setting procedures of the electric motor are counted in which a torque value to be set results in an at least partial sweeping over of the relevant individual range. If this relevant individual range is, for example, defined by the torque range from 200 to 400 Nm, a setting procedure that causes an increase of the then currently transmitted torque from 50 to 80 Nm would, for example, not be counted and would not be used for the correction of the post-calibration. A setting procedure in which, in contrast, a then currently transmitted torque is increased from 50 to 250 Nm would increase the number of setting procedures accordingly. This also applies, for example, to a setting procedure in which a then current torque value is increased from 250 Nm to, for example, 350 Nm.

Analogously, the number of setting procedures would likewise be increased when a then current torque value of, for example 300 Nm, should be increased to a value of 500 Nm. No increase in the number of setting procedures would, in contrast, occur if a then current torque value of, for example, 500 Nm should be increased to 600 Nm since in this connection the relevant individual range from 200 to 400 Nm is not swept over.

A respective weighting of the detected setting procedures is carried out, with the weighting being taken into account in the determination of the number of setting procedures. It may, for example, be achieved by this weighting that a setting procedure in which the relevant individual range is swept over across a large range is given a higher evaluation than a setting procedure in which only a very small portion of the relevant individual range is swept over.

The torque range swept over on a setting procedure from a then current torque to a torque value to be set is preferably determined for the weighting of the setting procedures, with the percentage proportion of the swept over torque range at the relevant individual range(s) being used as the weighted number of the setting procedure.

If, for example, the relevant individual range is swept over by 50% during the setting procedure, this would result in a weighted number of 0.5 setting procedures. Only when the relevant individual range has been completely swept over is this setting procedure counted with a value of 1. An even more exact correction of the first correction angle determined by the calibration procedure is achieved by this weighting of the number of setting procedures.

No further setting procedures are detected and/or no additional correction angle for the torque/angle dependence is determined after a preset number of setting procedures determined overall. The correction only takes place during a running-in phase which is defined by a number of setting procedures determined overall, that is the total number of setting procedures during all sequential time intervals. It may then be assumed, for example, that a correction is required up to a number of 10,000 setting procedures, with a corresponding weighting also being able to be taken into account; after this number, in contrast, it can be assumed that no further wear occurs at the reduction gear unit so that the correction is not necessary after the running-in phase. The running-in phase may be defined by a number of setting procedures, which is in particular disposed between approximately 5,000 and 15,000, preferably between approximately 8,000 and 12,000, in particular at approximately 10,000.

Further areas of applicability will become apparent from the description provided herein. It should be understood that the description and specific examples are intended for purposes of illustration only and are not intended to limit the scope of the present disclosure.

DRAWINGS

The disclosure will be described in more detail in the following with reference to the drawings.

DETAILED DESCRIPTION

Figure 1:
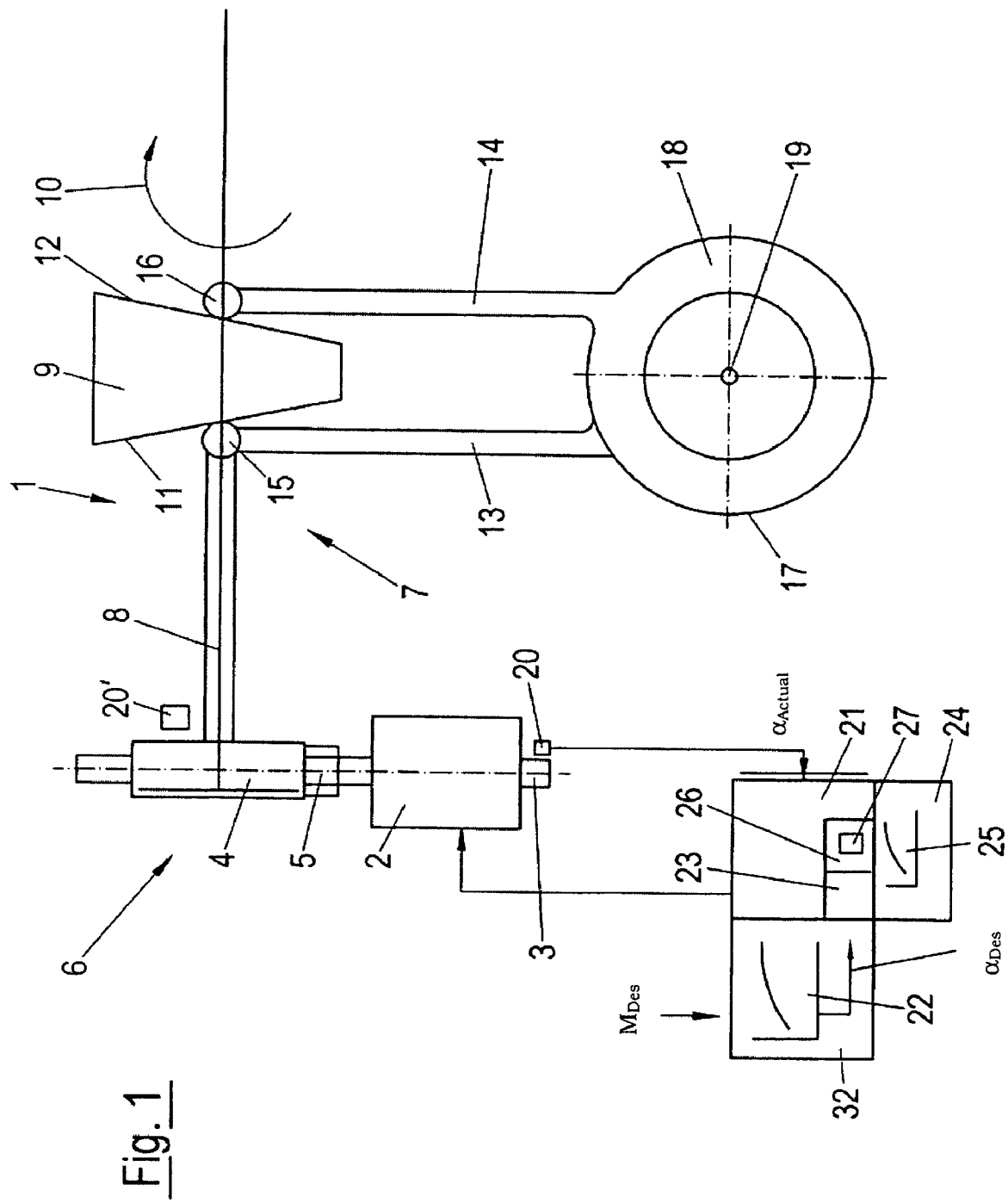
FIG. 1 is a schematic representation of an apparatus made in accordance with the invention.

The following description is merely exemplary in nature and is not intended to limit the present disclosure, application, or uses. It should be understood that throughout the drawings, corresponding reference numerals indicate like or corresponding parts and features.

FIG. 1 shows an apparatus for the setting of the torque transmitted by a friction clutch, with the friction clutch being able to be designed, for example, as shown in FIG. 1 of WO 03/025422 A1, to which reference is herewith again explicitly made.

The apparatus shown includes an actuator mechanism or chain 1, which comprises a controllable electric motor 2 having an armature shaft 3, a reduction gear unit 6 including a helical gear 4 and a screw 5, as well as a mechanism 7 by which the rotary movement of an output shaft 8 of the reduction gear unit 6 is converted into a translatory movement of a pressure plate of a friction clutch (which is not shown).

The mechanism 7 includes the output shaft 8 with a control disk 9, which is rotationally fixedly attached thereto, and which is rotatable around the output shaft 8 in accordance with an arrow 10 and has two end faces 11, 12 extending at an angle to one another.

At the end faces 11, 12 of the control disk 9, two ramp levers 13, 14 are journaled via rolls 15, 16 arranged at their free ends such that the ramp levers 13, 14 are moved apart in the manner of scissors on a rotation of the control disk 9 in accordance with the arrow 10. Each of the two ramp levers 13, 14 is connected at its end disposed opposite the rolls 15, 16 to a ring 17, 18, with the ring 17 being hidden by the ring 18 in FIG. 1. The rings 17, 18 are supported around an axis of rotation 19 such that, on a moving apart of the ramp levers 13, 14, the rings 17, 18 are moved apart in a translatory movement along the axis of rotation 19 and cause a corresponding translatory movement of the pressure plate (not shown) of the friction clutch.

Whereas in FIG. 1 the reduction gear unit 6 is made as a worm gear with the large inner friction inherent in such gears, a gear of another type may generally also be used, which may optionally be provided with an additional friction element. A helical gear may, for example, also be used.

A sensor 20 is arranged at the armature shaft 3 of the electric motor 2 and may be made, for example, as an incremental encoder and measures the angle of rotation of the armature shaft 3. As is shown in FIG. 1, the sensor 20 may alternatively also be arranged as a sensor 20' at the output shaft 8.

The sensor 20 or the alternative sensor 20' makes a signal available to a positional regulator 21, which corresponds to the angle of rotation $\alpha_{Actual}$ of the armature shaft 3. A desired angle of rotation $\alpha_{Des}$ is formed for the positional regulator 21 from the torque $M_{Des}$ to be transmitted by the friction clutch by a control unit 32 with reference to a characteristic 22 and a control signal is formed for the electric motor 2 from the difference between $\alpha_{Des}$ and $\alpha_{Actual}$. The characteristic 22 in this connection represents a given torque/angle dependence which may be determined empirically, for example. A measuring unit 23 is furthermore provided by which the power consumption of the electric motor 2 may be measured on the control by the positional regulator 21.

Figure 3:
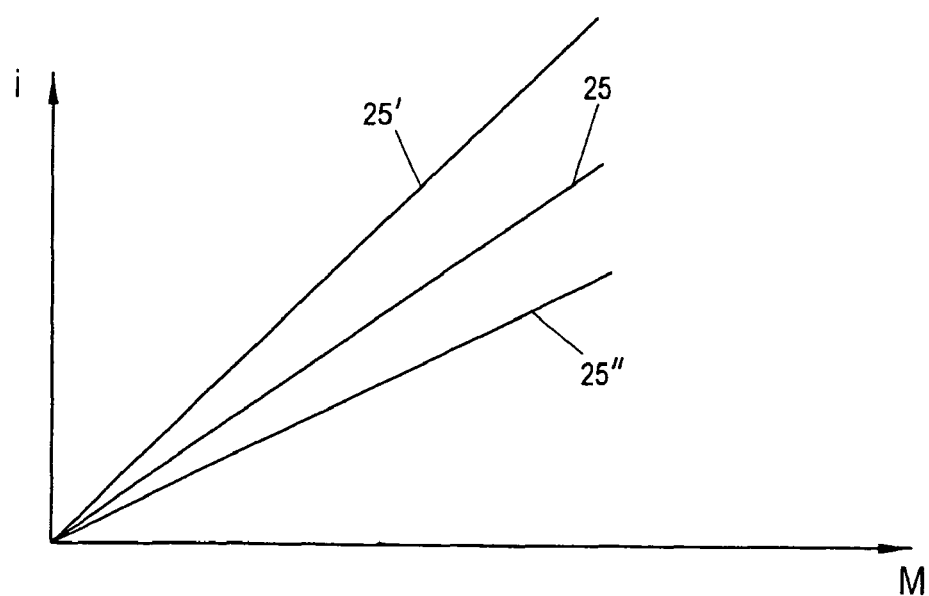
FIG. 3 illustrates a characteristic for the torque/power consumption dependence.

Furthermore, FIG. 1 shows a calibration unit 24 by which a first correction angle for the torque/angle dependence may be determined in a calibration procedure based on a characteristic 25 representing a torque/power consumption dependence. A corresponding characteristic 25, which shows a linear dependence between the power consumption i and the torque M, is shown in FIG. 3.

Finally, a correction unit 26 is present which includes a counter 27 with which the number of the setting procedures of the electric motor 2 may be determined within a preset time interval so that a correction of the given torque/power consumption dependence may take place by the correction unit 26 based on the determined number.

Figure 2:
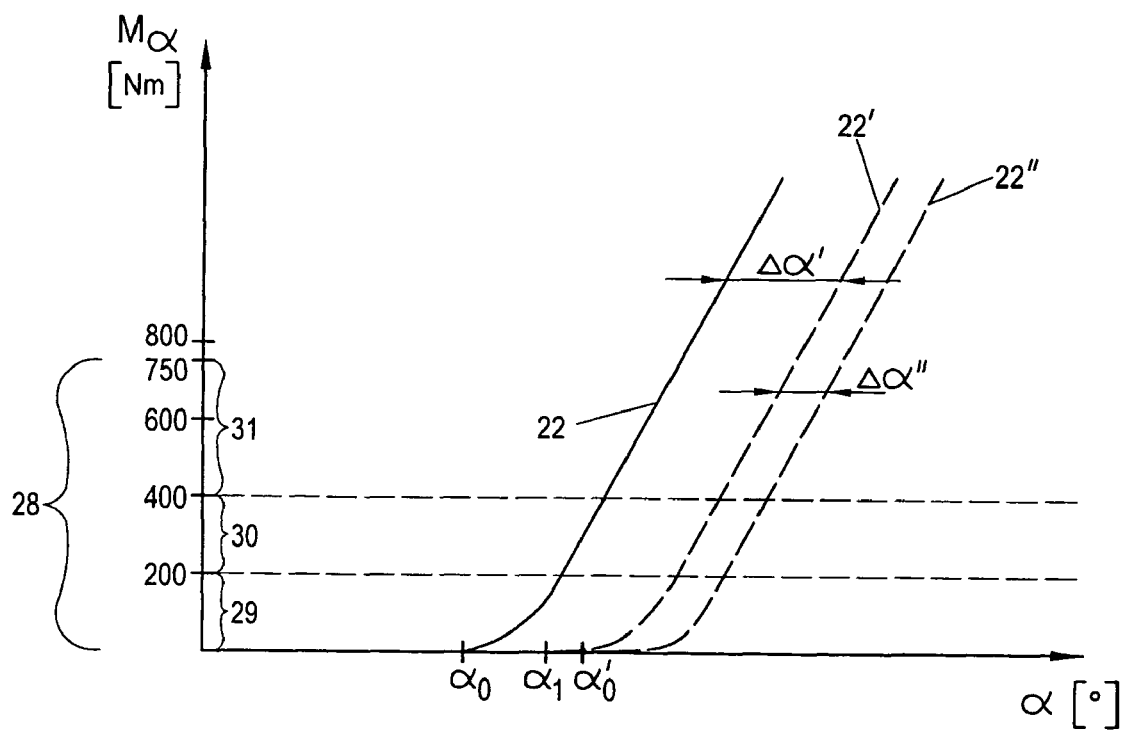
FIG. 2 illustrates a characteristic used in the method for the torque/angle dependence.

The characteristic 22, which represents the torque/angle dependence such as is used in the present disclosure, is shown in FIG. 2. As may be recognized from FIG. 2, the transmitted torque $M_\alpha$ is equal to zero as long as only the so-called release clearance of the friction clutch is run through. The release clearance ends when the angle of rotation α reaches the value $\alpha_0$ at which the disks of the friction clutch contact one another for the first time and start to transmit a torque (the so-called "kiss point"). The characteristic 22 extends in non-linear fashion within a transition region until it extends in a substantially linear manner steeply upwardly from an angle of rotation $\alpha_1$.

The kiss point of the disks $\alpha_1$ is displaced to a value $\alpha_0'$ by wear of the clutch disks. In a corresponding manner, the characteristic 22 is displaced to a characteristic 22' which takes account of the wear within the friction clutch for the torque/angle dependence, which is taken into account by the post-calibration. In this connection, the corrected characteristic 22' may be used instead of the original characteristic 22 in order to set a torque to be transmitted by a correspondingly corrected angle of rotation α' so that, in this case, the angles of rotation resulting in each case from the corrected characteristic 22' directly form the correction angles α'. It is generally also possible that the displacement angle $\Delta\alpha'=\alpha_0'-\alpha_0$ is stored as a correction angle and first the desired angle of rotation α corresponding to the torque to be set is determined based on the original characteristic 22 for the setting of a torque and the desired angle of rotation is subsequently corrected by adding the first correction angle Δα'.

The displaced characteristic 22' is determined by the calibration procedure described initially and in WO 03/025422 A1. A further correction of this characteristic 22' is furthermore carried out to take account of wear occurring within the reduction gear unit.

As initially described, the electric motor 2 is actuated for the calibration procedure until the release clearance has been overcome and a torque given by the disks is transmitted. In this connection, the given torque is determined by measurement of the current consumed by the electric motor 2 based on an empirically determined torque/power consumption dependence shown by the characteristic 25.

If wear occurs within the reduction gear unit 6 by which the efficiency of the reduction gear unit 2 is degraded, this has the result that the originally determined torque/current consumption dependence is no longer correct, but rather a higher power consumption is required in the electric motor 2 for the transmission of a given torque. This is shown in FIG. 3 by a characteristic 25' displaced upwardly. If this additional wear is taken into account correctly in the calibration procedure, the corrected characteristic 22' shown in FIG. 2 is not produced, but rather the characteristic 22", which is corrected again, which is likewise shown by dashed lines and which is displaced by an additional correction angle Δα" with respect to the originally corrected characteristic 22'. This additional correction angle Δα" thus has to be added to the desired angle of rotation α' obtained from the corrected characteristic 22' determined by the calibration procedure on the setting of a torque $M_\alpha$ to be transmitted.

In the case of an increase in efficiency due to the wear occurring within the reduction gear unit 6, in contrast, an actual torque/power consumption dependence results such as is shown in FIG. 3 by a characteristic 25" displaced downwardly. In this case, the additional correction angle Δα" is to be deducted from the corrected desired angle of rotation α'.

The additional correction angle Δα" is determined in that in each case the number of setting procedures of the electric motor 2 is determined between two calibration procedures. In this connection, only those setting procedures are taken into account in which the torque to be transmitted at least partly sweeps over a preset relevant torque range during the setting procedure. For this purpose, a preset torque range 28 is first preset, which is defined in FIG. 2, for example, by the range from 0 to 750 Nm. This preset torque range is in turn divided into three individual ranges 29, 30, 31, with the lower individual range 29 in the embodiment in accordance with FIG. 2 extending from 0 to 200 Nm, the middle individual range 30 from 200 to 400 Nm and the upper individual range 31 from 400 to 750 Nm. The middle individual range 30 in this connection forms the so-called relevant individual range 30, which is relevant to the determination of the additional correction angle.

A setting procedure by which a switch should be made from a then currently set torque value of 50 Nm to a value of 150 Nm is thus not counted since, in this setting procedure, the relevant individual range 30 (200 to 400 Nm) is not swept over. A subsequent torque demand of, for example, 250 Nm would, in contrast, be counted since the relevant individual range 30 is partly swept over on the increase of the torque from the then current 150 Nm to the demanded 250 Nm.

The same applies to a further demand in which a torque value of, for example, 500 Nm should be set since the relevant individual range 30 is likewise partly swept over on the setting procedure from the then current 250 Nm to the demanded 500 Nm.

The weighting takes place in that the percentage proportion of the swept over range is in each case determined at the width of the relevant individual range 30.

The first named setting from 150 Nm to 250 Nm has the result that a range of 50 Nm (namely from 200 Nm to 250 Nm) of the relevant individual range 30 is swept over for this setting procedure. With respect to the total width of the relevant individual range 30 of 200 Nm (400 Nm−200 Nm), this setting procedure thus results in a proportion of 50/200=0.25 so that the value 0.25 is stored, for example in an EEPROM of the control unit 32, as the weighted number for this setting procedure.

For the second setting procedure, in contrast, the relevant individual range 30 is swept over across a range of 150 Nm (400 Nm−250 Nm) so that a weighted number results for this setting procedure of 150/200=0.75, which is added to the previously stored value of 0.25 and stored, for example in the EEPROM of the control unit 32.

Analogously, all further setting procedures up to the end of the preset time interval, in particular up to the next calibration procedure, are added up in a weighted manner so that at the end of the preset time interval a sum of the weighted number of setting procedures results which is used for the taking into account of the wear within the reduction gear unit 6.

It is assumed for this taking into account that there is a linear relationship between the weighted number of setting procedures and the additional correction angle $\Delta\alpha''$ resulting therefrom and that, for example with a number of 10,000 setting procedures overall, an additional correction angle $\Delta\alpha''$ of approximately 2° is to be expected. With a total number of, for example, 100 setting procedures during the time interval between two calibration procedures to be taken into account, an additional correction angle $\Delta\alpha''$ of 0.02° would thus result which is to be added to or subtracted from the desired angle of rotation α' to be set obtained from the characteristic 22'.

Since the weighted number of the setting procedures of the electric motor 2 is influenced by the different driving behavior of the vehicle operator as well as by corresponding environmental influences, the wear occurring within the reduction gear unit 6 is thus taken into account realistically on the setting of a torque to be transmitted.

Since it can furthermore be assumed that, after a predetermined number of total kilometers, for example after approximately 10,000 km, no further wear occurs at the reduction gear unit 6, the additional correction of the angle of rotation may be set after reaching this total mileage so that a further determination of the number of setting procedures of the electric motor 2 is no longer necessary.

What is claimed is:

1. A method for the setting of the torque transmitted by a friction clutch by means of an actuator chain having an electric motor which effects a displacement of a pressure plate of the friction clutch via a reduction gear unit and a mechanism for the conversion of the rotary movement of the electric motor into a translatory movement, wherein a desired angle of rotation ($\alpha_{Des}$) of the electric motor or of a link of the actuator chain is determined from the torque to be transmitted by the friction clutch based on a predetermined torque/angle dependence and is set in a setting procedure by means of a regulator acting on the electric motor, and wherein a calibration procedure takes place for the compensation of wear within the friction clutch which results in a variation of the given torque/angle dependence and, in the calibration procedure, the power consumption of the electric motor on the closing of the clutch is measured, a torque respectively corresponding to the measured power consumption is determined via a given torque/power consumption dependence, and a first correction angle ($\alpha'$, $\neq\alpha'$) for the torque/angle dependence is determined from the determined torque and a then currently detected angle of rotation ($\alpha_{Actual}$) in the calibration procedure, with a variation of the torque/power consumption dependence caused by wear occurring within the actuator chain additionally being taken into account by determining the number of the setting procedures of the electric motor within a set time interval and using the number for correcting the torque/power consumption dependence.

2. The method in accordance with claim 1, wherein the number of setting procedures of the electric motor is in each case determined between two sequential calibration procedures.

3. The method in accordance with claim 1, wherein the number of setting procedures is in each case determined in a plurality of sequential time intervals.

4. The method in accordance with claim 3, wherein the number of setting procedures in each case determined in sequential time intervals are added up.

5. The method in accordance with claim 1, wherein the calibration procedure in each case takes place after the shutting down of the engine of a vehicle provided with the friction clutch.

6. The method in accordance with claim 1, wherein an additional correction angle ($\Delta\alpha''$) is determined for the torque/angle dependence based on the number of setting procedures of the electric motor.

7. The method in accordance with claim 6, wherein the additional correction angle ($\Delta\alpha''$) is added to or subtracted from the first correction angle ($\alpha'$, $\Delta\alpha'$) in dependence on the wear occurring within the actuator chain.

8. The method in accordance with claim 6, wherein the additional correction angle ($\Delta\alpha''$) is determined in linear dependence on the number of the setting procedures determined overall.

9. The method in accordance with claim 1, wherein the torque to be set is selected from a preset torque range that is divided into a plurality of individual ranges having at least one relevant individual range, and wherein only those setting procedures are used for correcting the torque/power consumption dependence in which torques are transmitted which fall at least into one of the relevant individual ranges.

10. The method in accordance with claim 9, wherein the preset torque range is divided into three individual ranges, and wherein the relevant individual range is formed by the middle of the three individual ranges.

11. The method in accordance with claim 9, wherein in each case a weighting of the number of the setting procedures is carried out, and wherein the weighting is taken into account for the determination of the number of setting procedures used to correct the torque/power consumption dependence.

12. The method in accordance with claim 11, wherein the torque range swept over on a setting procedure from a then current torque value to a torque value to be set is determined, and wherein the percentage portion of the swept over torque range to the at least one relevant individual range is used as the weighted number of the setting procedure.

13. The method in accordance with claim 1, wherein a weighting of the number of the setting procedures is carried out such that the weighting is taken into account for the determination of the number of setting procedures used to correct the torque/power consumption dependence, wherein the torque range swept over on a setting procedure from a then current torque value to a torque value to be set is determined, and wherein the percentage portion of the swept over torque range to a preset torque range is used as the weighted number of the setting procedure.

14. The method in accordance with claim 1, wherein no correction is determined for the torque/power consumption dependence after a preset total number of setting procedures has been determined.

15. An apparatus for the setting of the torque transmitted by a friction clutch comprising:
an actuator chain comprising an electric motor, a reduction gear unit and a mechanism for the conversion of the rotary movement of the electric motor into a displacement of a pressure plate of the friction clutch;
a control unit for the determination of a desired angle of rotation ($\alpha_{Des}$) of the electric motor or of a link of the actuator chain from the torque to be transmitted by the friction clutch based on a given torque/angle dependence;
a regulator which acts on the electric motor and by which the desired angle of rotation ($\alpha_{Des}$) can be set in a setting procedure;
a sensor for the detection of the current angle of rotation ($\alpha$);
a measurement unit for the measurement of the power consumption of the electric motor;
a calibration unit for the determination of a first correction angle ($\alpha'$, $\Delta\alpha''$) for the torque/angle dependence based on the power consumption measured by the measurement unit, on a given torque/power consumption dependence and on the angle of rotation ($\alpha_{Actual}$) then currently detected by the sensor; and
a correction unit for the taking into account of a variation of the torque/power consumption dependence caused by wear occurring within the actuator chain, wherein the correction unit includes a counter for the determination of the number of setting procedures of the electric motor within a preset time interval and uses the determined number for correcting the torque/power consumption dependence.

16. The apparatus in accordance with claim 15, wherein the sensor is arranged at a shaft of the gear reduction unit or of the electric motor.

17. The apparatus in accordance with claim 15, wherein the reduction gear unit is made as a worm gear.

18. A method for setting the torque transmitted by a friction clutch having a moveable pressure plate, comprising:
providing a clutch actuator mechanism having an electric motor driving a gear unit for controlling operation of a mechanism converting rotary movement of the electric motor into translational movement of the pressure plate;
determining a desired angle of rotation ($\alpha_{Des}$) from a desired torque ($M_{Des}$) to be transmitted by the friction clutch based on a first characteristic representing a given torque/angle dependence;
determining an actual angle of rotation ($\alpha_{actual}$);
generating a control signal for the electric motor based on the difference between the desired and actual angles of rotation for establishing a setting procedure of the electric motor;
conducting a calibration procedure to compensate for wear in the friction clutch by determining a first correction angle ($\Delta\alpha'$) for correcting the first characteristic based on a second characteristic representing a given torque/power consumption dependence; and
conducting a correction procedure to compensate for wear in the clutch actuator mechanism by determining a second correction angle ($\Delta\alpha''$) based on variations in the second characteristic.

19. The method of claim 18 wherein the second correction angle is determined based on the number of setting procedures of the electric motor within a set time interval.

20. The method of claim 19 wherein the number of setting procedures of the electric motor is determined between a pair of sequential calibration procedures.

21. The method of claim 20 wherein only the setting procedures are counted in which the torque to be transmitted by the friction clutch sweeps over a preset torque range.

22. The method of claim 21 wherein the preset torque range includes at least these individual torque ranges defining a first individual torque range, a second individual torque range and a third individual torque range, and wherein only the setting procedures in which the torque sweeps over the second individual range are counted for use in determining the number of setting procedures.

23. The method of claim 22 wherein each setting procedure is weighted based on the percentage proportion of the torque which sweeps over the second individual torque range, and wherein each of the weighted setting procedures is summed to establish a weighted number of setting procedures between each pair of sequential calibration procedures.

24. The method of claim 23 wherein the second correction angle is determined based on the weighted number of setting procedures.

25. The method of claim 20 wherein the number of setting procedures between each pair of sequential calibration procedures are added up and used to determine the value of the second correction angle.

26. The method of claim 18 wherein the correction procedure is conducted to account for wear in the gear unit.

27. The method of claim 18 wherein the second correction angle can be added to or subtracted from the first correction angle.

* * * * *